US012612319B2

(12) United States Patent
Johnson et al.

(10) Patent No.: US 12,612,319 B2
(45) Date of Patent: Apr. 28, 2026

(54) INLINE FILTERWELL FLOATING WEIR DISPENSER

(71) Applicant: King Technology, Inc., Minnetonka, MN (US)

(72) Inventors: Jeffrey D Johnson, Edina, MN (US); Eric Barton, Eden Prairie, MN (US); Darrin M Swagel, Minnetonka, MN (US)

(73) Assignee: King Technology, Inc., Minnetonka, MN (US)

( * ) Notice: Subject to any disclaimer, the term of this patent is extended or adjusted under 35 U.S.C. 154(b) by 516 days.

(21) Appl. No.: 18/116,615

(22) Filed: Mar. 2, 2023

(65) Prior Publication Data

US 2023/0295024 A1     Sep. 21, 2023

Related U.S. Application Data

(60) Provisional application No. 63/372,328, filed on Mar. 3, 2022.

(51) Int. Cl.
*C02F 103/42*     (2006.01)
*C02F 1/68*     (2023.01)

(52) U.S. Cl.
CPC .......... *C02F 1/688* (2013.01); *C02F 2103/42* (2013.01); *C02F 2201/006* (2013.01); *C02F 2303/04* (2013.01)

(58) Field of Classification Search
CPC  C02F 1/688; C02F 2103/42; C02F 2201/006; C02F 2303/04
USPC ...................................................... 210/198.1
See application file for complete search history.

(56) References Cited

U.S. PATENT DOCUMENTS

| | | | |
|---|---|---|---|
| 4,842,729 | A | 6/1989 | Buchan |
| 7,059,540 | B2 | 6/2006 | King et al. |
| 7,060,190 | B2 | 6/2006 | King et al. |
| 7,487,790 | B2 | 2/2009 | King et al. |
| 8,617,481 | B1 | 12/2013 | Snetting et al. |
| 2005/0211613 | A1 | 9/2005 | King |
| 2010/0163470 | A1 | 7/2010 | Oranski et al. |
| 2013/0098820 | A1 | 4/2013 | King et al. |
| 2019/0048604 | A1 | 2/2019 | Guy et al. |
| 2020/0216341 | A1 | 7/2020 | Guy et al. |
| 2021/0199136 | A1 | 7/2021 | Tulett et al. |
| 2021/0270053 | A1 | 9/2021 | Brennan |

FOREIGN PATENT DOCUMENTS

| | | |
|---|---|---|
| EP | 1428799 A2 | 6/2004 |
| WO | 2023167988 A2 | 9/2023 |

OTHER PUBLICATIONS

International Searching Authority, "International Search Report and Written Opinion" From Application No. PCT/US2023/014359, mailed Aug. 16, 2023, pp. 17.
International Searching Authority, "International Search Report and Written Opinion" From Application No. PCT/US2024/044734, Mailed Dec. 10, 2024, pp. 19.
European Patent Office, "Extended European Search Report" , From Application No. 23763926.5, Dated Jan. 29, 2026, pp. 12.

*Primary Examiner* — Hayden Brewster
(74) *Attorney, Agent, or Firm* — Fredrikson & Byron, P.A.

(57) ABSTRACT

An inline filterwell system with a floating weir that delivers a dispersant into the water in an inline filterwell where a cartridge dispenser dispersant rate of a cartridge dispenser located in a cartridge jacket of the weir is isolated from changes in the velocity of water flowing through an open body of the weir.

21 Claims, 10 Drawing Sheets

FIG. I
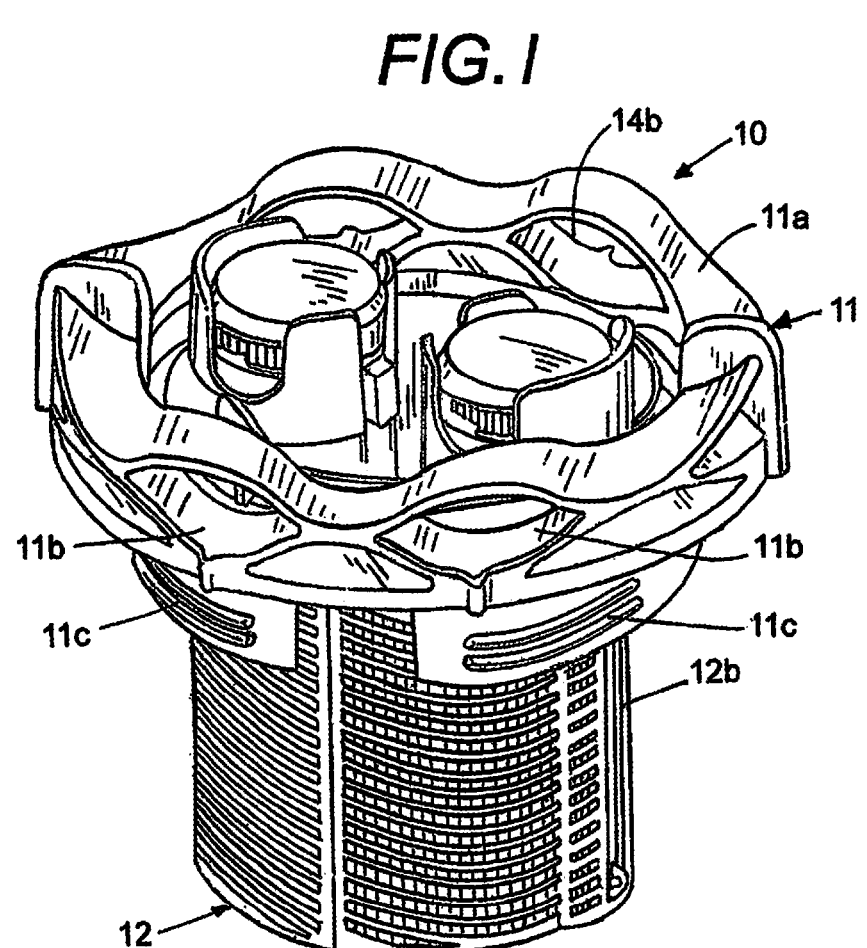
FIG. IA
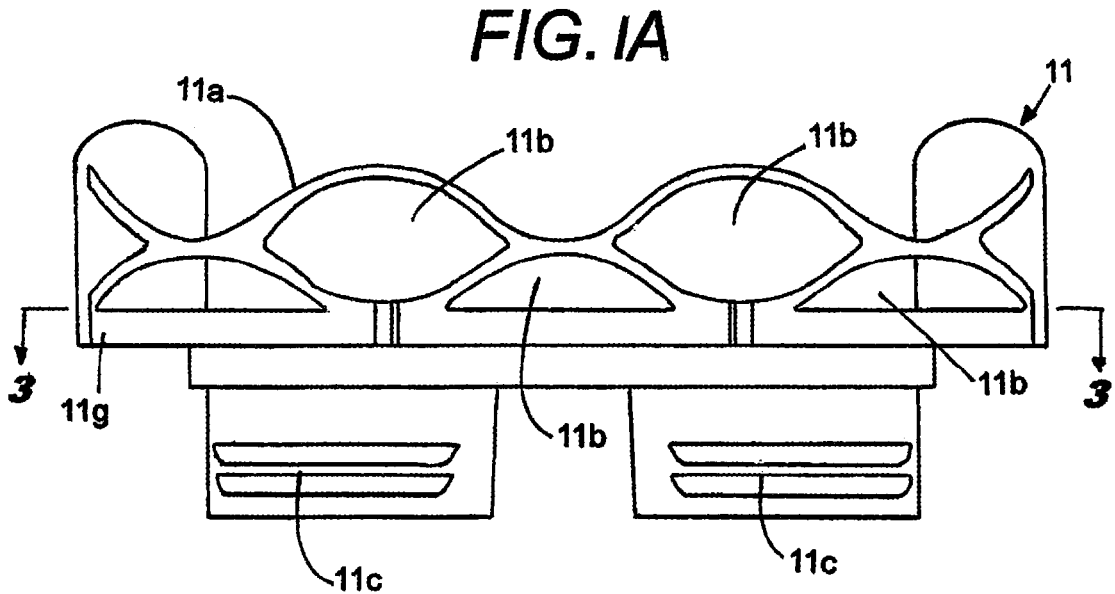

INLINE FILTERWELL FLOATING WEIR DISPENSER

CROSS REFERENCE TO RELATED APPLICATIONS

This application claims priority of provisional application Ser. No. 63/372,328 filed Mar. 3, 2022.

STATEMENT REGARDING FEDERALLY SPONSORED RESEARCH OR DEVELOPMENT

None

REFERENCE TO A MICROFICHE APPENDIX

None

BACKGROUND OF THE INVENTION

The use of dispensers that release a dispersant or dispersants into the water in a hot tub or the like to maintain the water, which recirculates within the hot tub, in a user-friendly condition is well known. In one example a dispenser, which contains one or more dispersants, floats in the open area of the hot tub and releases dispersants into the hot tub water through water contact with the dispersants within the dispenser. In another example a dispenser containing dispersants is installed in the open filterwell of a hot tub water circulation system. In still another example a stick shaped dispenser is either inserted into the core of a filter cartridge, where it is free rattle around as water flows through the filter core, or the stick shape dispenser may be extended perpendicularly outward from the underside of a skimmer basket.

Typically, hot tubs or the like have a filterwell coupled to a recirculating water system that circulates water through an open filterwell, which contains a filter cartridge that removes debris from the water as water also flows through the filter cartridge. In this type of system, a weir gate or similar device separates the filterwell from the area occupied by the hot tub users. Since the filterwell, which contains a filter cartridge, is located outside of the main hot tub sitting area it is a convenient location for placing a dispenser therein since it does not interfere with persons using the hot tub. Dispensing cartridge have been successfully placed in open water filterwell locations where the dispensers do not interfere with a normal flow of water through the filter media while at the same time retaining the ability to effectively deliver dispersant into the recirculating water in the filterwell.

While various devices have been employed to deliver dispersants into a hot tub filterwell one of the more difficult locations to install a dispenser is within a filterwell basket, which is located in an inline water circulation system. Typically, rapid changes in water velocity within an inline water circulation system may have an adverse effect on a dispenser dispersant rate as changes in water velocity past a dispenser's water ports can affect the dispenser dispersant rate. For example, water velocity water changes in an inline circulation system may be due to starting and stopping of an inline water circulation pump or to debris within the filter-well basket. Consequently, a dispenser dispersion rate may be low if the water circulation pump is off; however, when the water circulation pump is on the dispenser dispersant rate may increases substantially in response to an increase in water velocity past the dispenser water ports. In still other cases the instability of water flow past a dispenser located in an inline water circulation system, may change the dispenser dispersion rate because of debris in the skimmer basket that alters the water flow past the dispenser water ports.

SUMMARY OF THE INVENTION

An inline filterwell floating weir dispensing system including a floating weir located in a filterwell basket with the floating weir floatingly supporting a cartridge dispenser with a set of dispensing ports therein that are shielded from unwanted water velocity changes within the floating weir through a high resistance water flow passage, which is formed between an interior surface of a cartridge jacket in the floating weir and an exterior surface of a replaceable cartridge dispenser. A set of protuberances in the cartridge jacket maintain the cartridge jacket in spaced condition from an outer surface of a dispensing cartridge creating a circumferential fluid chamber that forms a high flow resistance water path that shields the dispensing ports of the cartridge from the high velocity water flowing though the weir thereby avoiding unwanted rapid dispersant rates.

BRIEF DESCRIPTION OF THE DRAWINGS

FIG. 1 is a perspective of view of an inline filterwell floating weir dispensing system mountable within an inline water circulation system of a hot tub;

FIG. 1A is an isolated side view of a retaining ring for a floating weir dispensing system of FIG. 1;

FIG. 4A top view of the filterwell basket of FIG. 2 and the locking ring of FIG. 2 in engagement with each other;

DESCRIPTION OF THE PREFERRED EMBODIMENTS

Figures 2, 3:
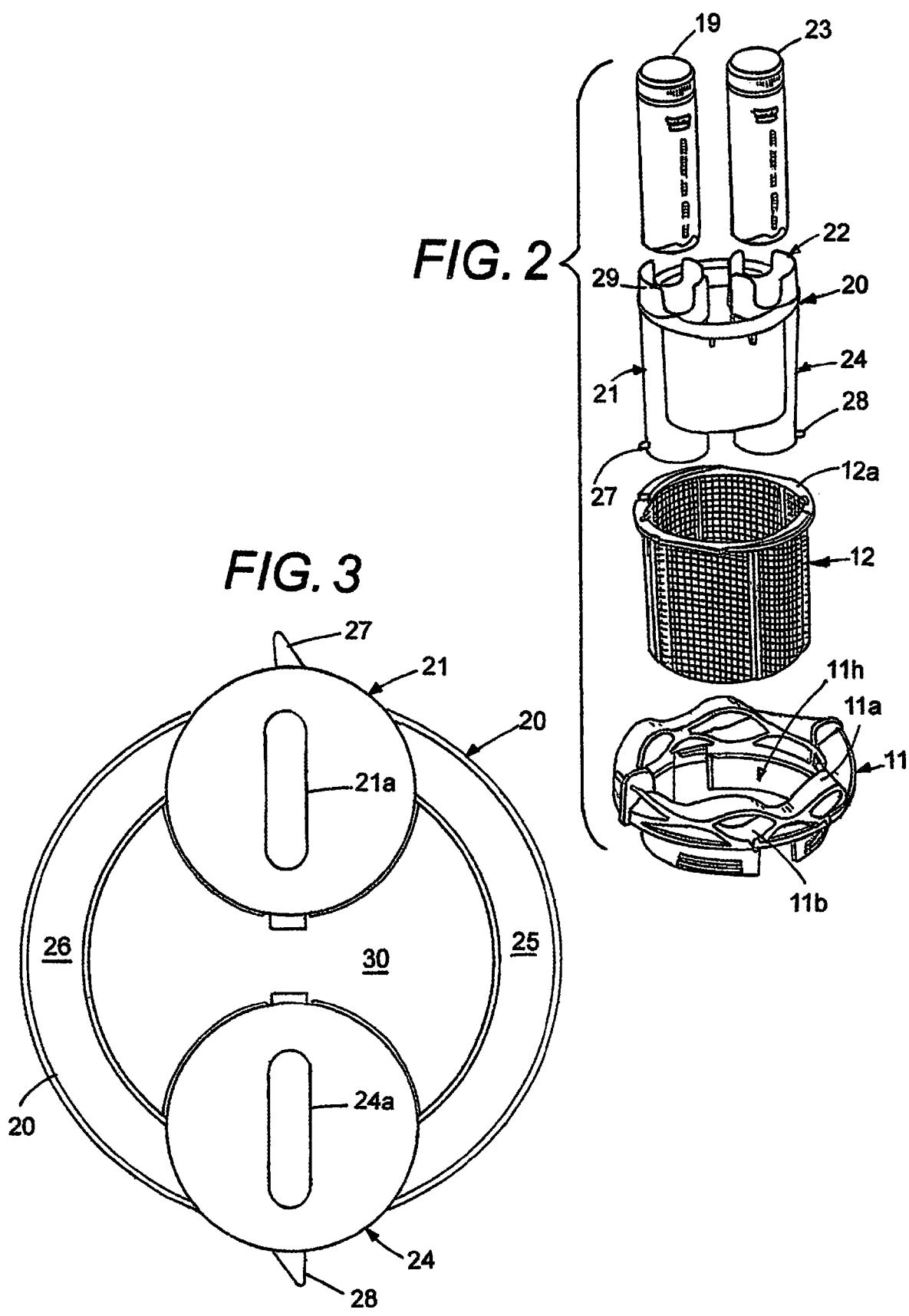
FIG. 2 is an exploded view of the inline filterwell floating weir dispensing system of FIG. 1.
FIG. 3 is a bottom view of the inline filterwell floating weir of FIG. 2.

FIG. 1 is a perspective of view of a floating weir dispensing system 10 mountable within an inline water circulation system of a body of recreational water such as a hot tub or spa and FIG. 2 is an exploded view of the floating weir dispensing system of FIG. 1. The floating weir dispensing system includes a retaining ring 11 with an undulating top surface 11*a* and a set of circumferential spaced lateral openings 11*b*, which prevent suction injury should someone accidently sit on retaining ring 11 as a water pump circulates water through the inline water circulation system.

Figure 4:
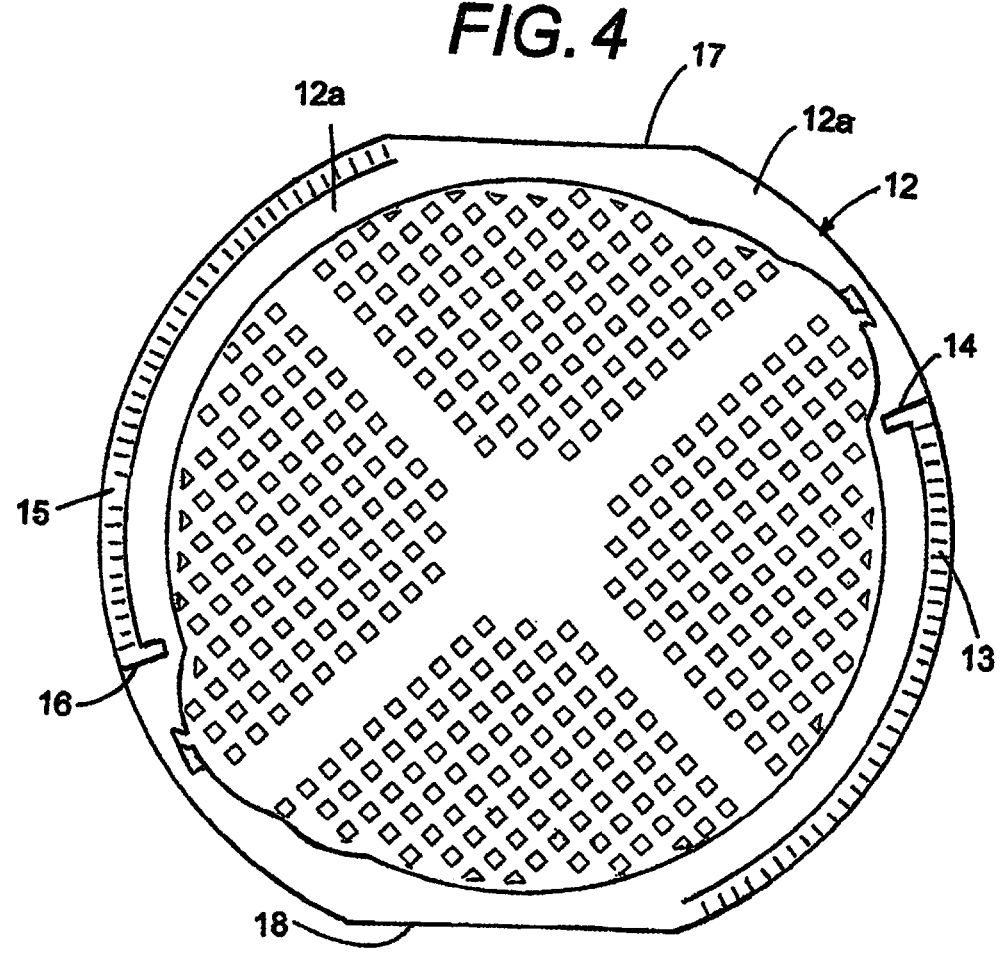
FIG. 4 is a top view of the filterwell basket of FIG. 2.
Figure 4A:
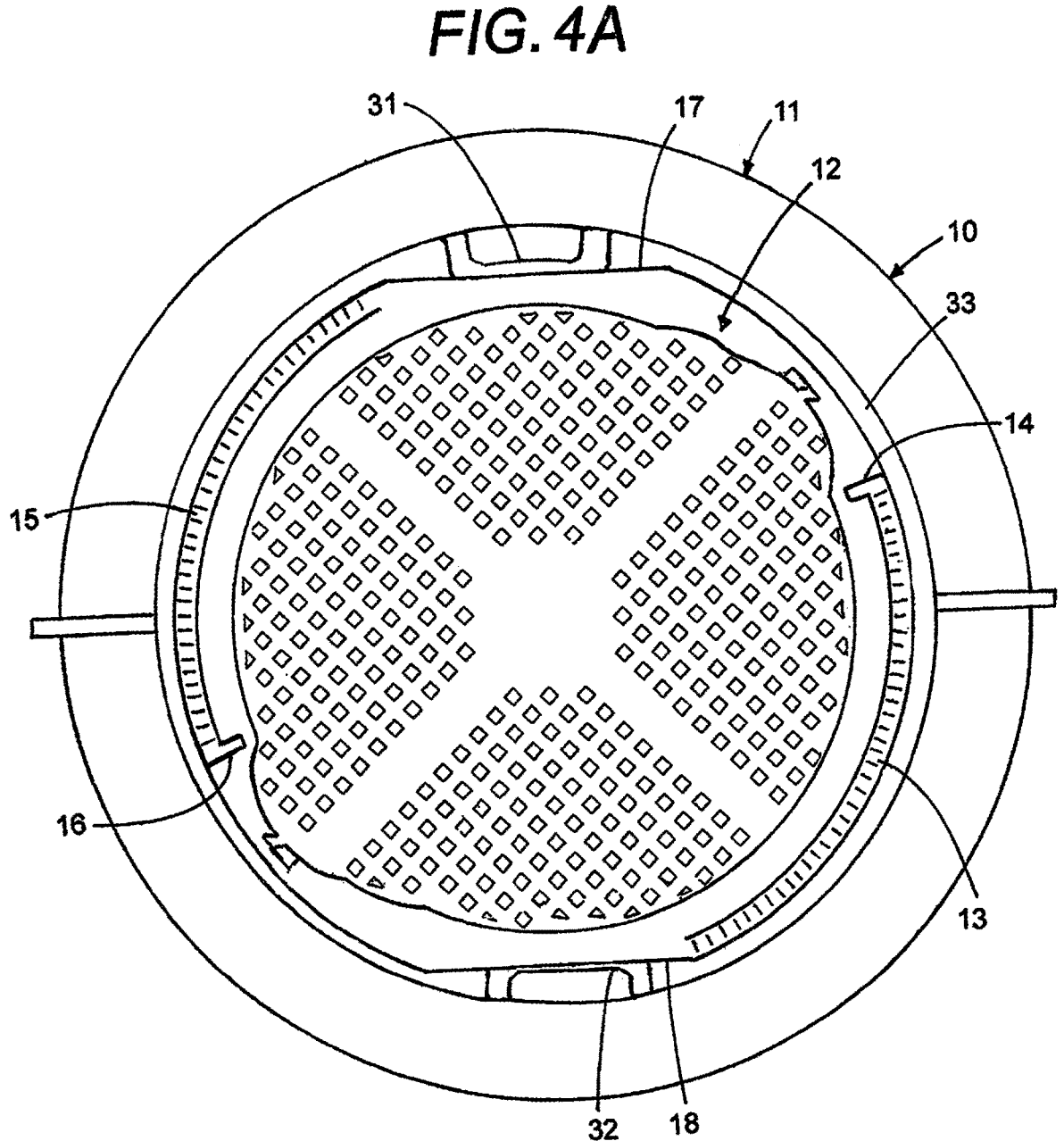

Retaining ring 11, which is also shown in a side view in FIG. 1A and a top view in FIG. 4A includes a set of threads 11*c* that are circumferentially spaced around ring 11 for rotatable engagement of ring 11 with an inline filterwell housing. Ring 11 also includes an internal ledge 33 (FIG. 4A) that engages a rim 12*a* on filterwell basket 12 to support the filterwell basket within a hot tub circulation system.

FIG. 1 and FIG. 1A show an annular base 11*g* with a central water inlet 11*h* with the annular base 11*g* having an undulating top surface 11*a* and a sidewall with a set of openings 11*b* therein for water passage therethrough in the event of a blockage of the central water inlet to avoid suction injury to anyone inadvertently blocking the central inlet. An external thread 11*c* on retaining ring 11 is threadingly engageable with a filterwell housing typically found in a water recirculation system such as hot tub or spa.

In this example, as illustrated in FIG. 2 the floating weir 20 nests within filterwell basket 12 and a first cartridge dispenser 19 nests within a first cartridge jacket 21 and a second cartridge dispenser 23 nests within a second cartridge jacket 24. The floating weir is free to move up and down within basket 12 in response to water level changes within the floating weir while the cartridge dispensers 19 and 23 remain nested in a dispensing condition within the respective cartridge jackets of the floating weir.

FIG. 2 shows cartridge jacket 21 includes a split collar 29 and cartridge jacket 24 also includes a split collar 22 with reliefs or gaps in each of the split collars that permit a person to grasp and remove a cartridge dispenser held within the cartridge jacket. In the example shown in FIG. 6 the collars extend above a water line 9 when the weir is allowed to float freely with gaps or reliefs in the split collar also providing a path for water to enter the cartridge jacket.

FIG. 3 is a bottom view of the floating weir 20 revealing a first trapped air float 25 and a second trapped air float 26 that supports weir 20 while allowing the weir to move up and down within filterwell basket 12 as water flows through a central open region 30 in weir 20. As shown in FIG. 3 the first cartridge jacket 21 on weir 20 includes an elongated water outlet 21*a* and the second cartridge jacket 24 on weir 20 also includes an elongated water outlet 24*a*. Cartridge jacket 21 includes a lateral extension or follower 27 that engages a first guide slot 12*b* (FIG. 3B) in basket 12 and cartridge jacket 24 includes a lateral extension or follower 28 that engages a further guide slot (not shown) in in basket 12, which is diagonally opposite of the first guide slot with the guide slots allowing the floating weir to move up and down within filterwell basket 12.

Figure 3A:
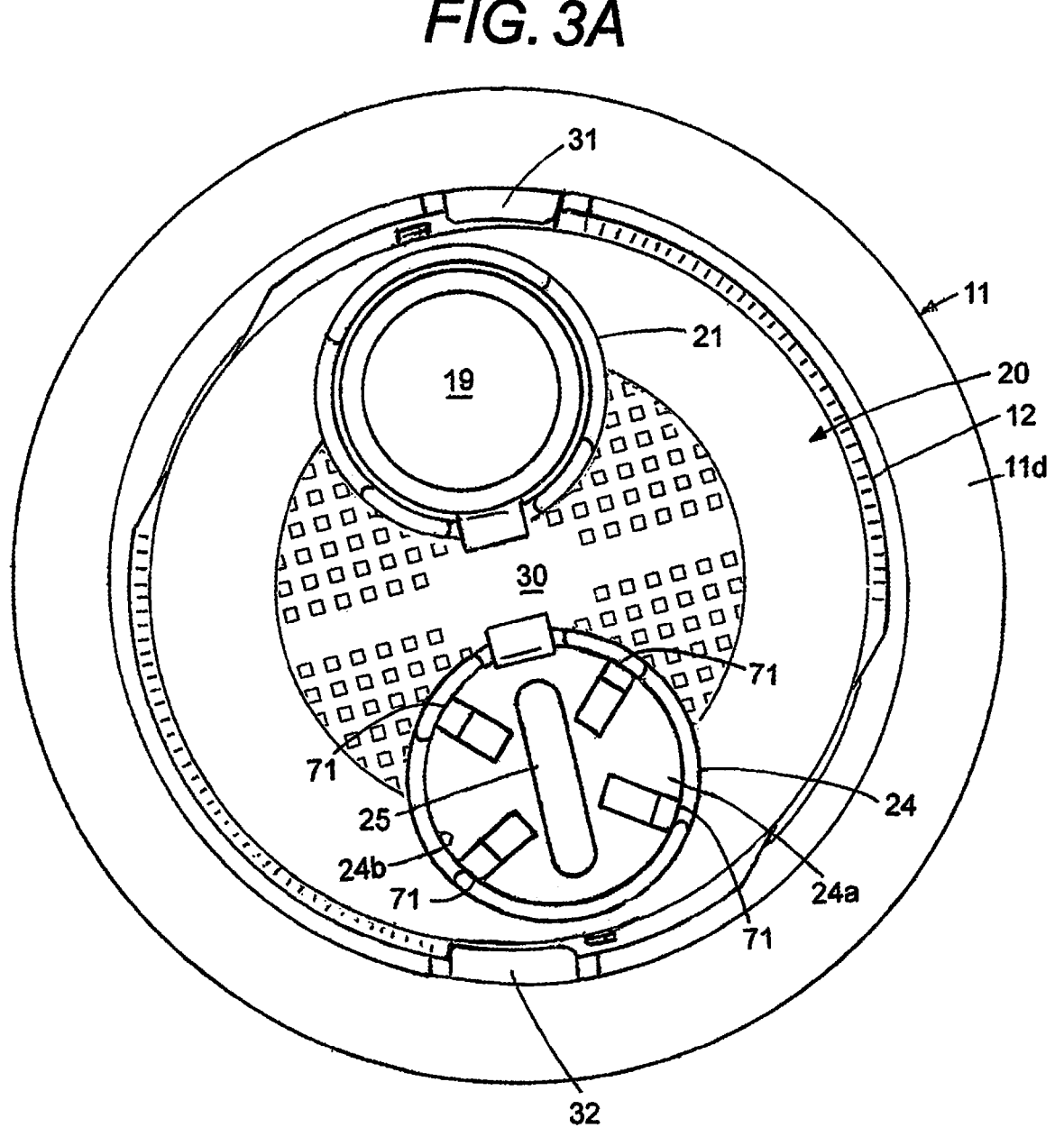
FIG. 3A is top view of the floating weir of FIG. 2 with a retaining ring and a cartridge jacket with a cartridge dispenser and a further cartridge jacket without a cartridge dispenser.
Figures 3B, 3C:
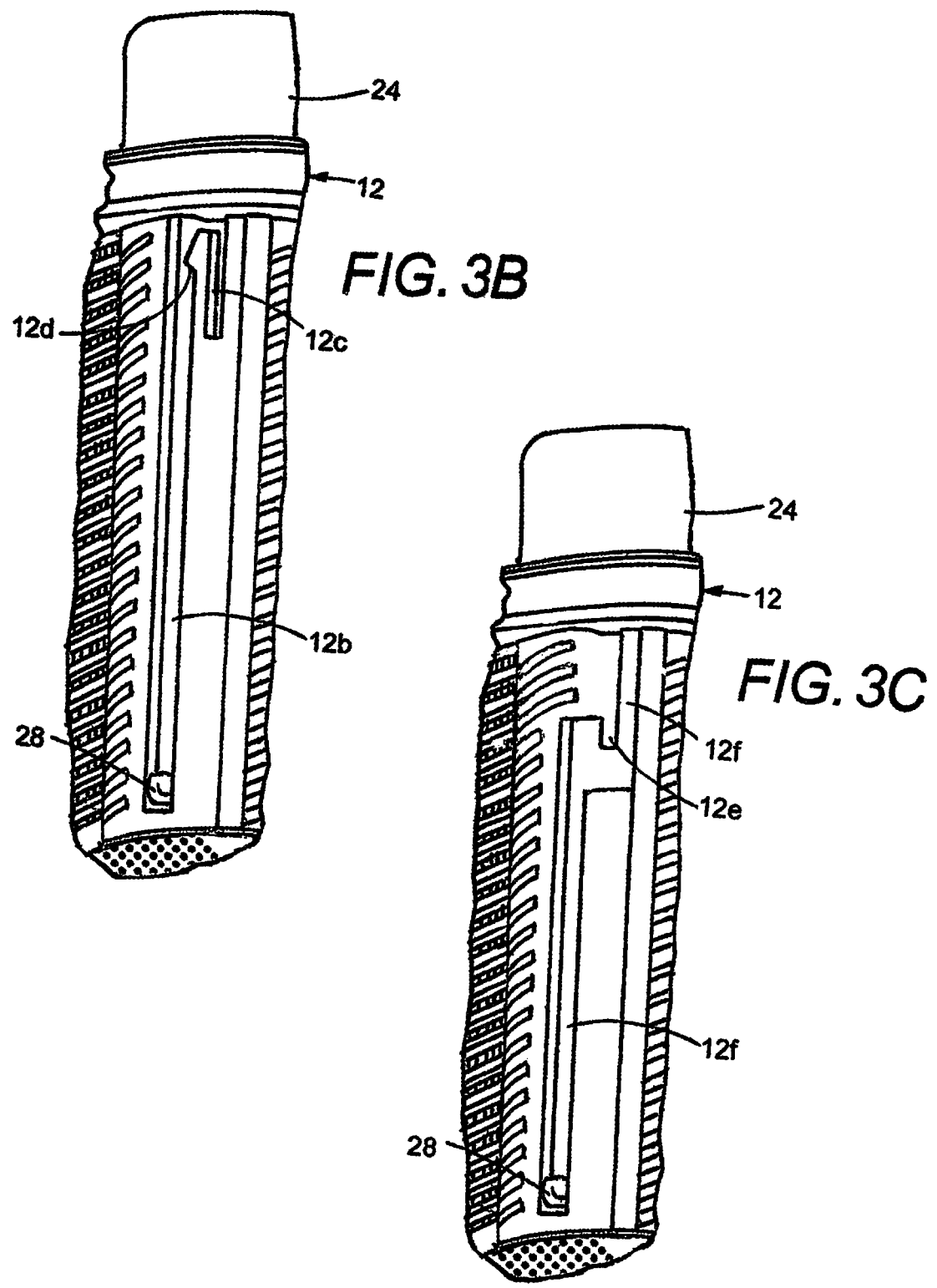
FIG. 3B is a partial sectional view of a side portion of the filterwell basket of FIG. 2; showing a guide slot in the filterwell basket with a floating weir follower weir in the guide slot and a latch that retains the floating weir within the filterwell basket.
FIG. 3C is a partial sectional view of a side portion of the filterwell basket of FIG. 3; showing a lateral offset guide slot with a lip to retain the floating weir within the filterwell basket.

FIG. 3B is an isolated view of a portion of filterwell basket 12 that includes a guide slot 12*b* with a follower 28 (also FIG. 3) extended therethrough. Located at the top end of guide slot 12*b* is an integral cantilevered stop 12*c* with a hook 12*d* that engages weir follower 28 to limit upward buoyant movement of weir 20 within basket 12. Similarly, an identical guide slot on a diagonally opposite side of basket 12 includes an identical cantilevered stop having a hook (not shown) that engages follower 27 on weir 20. While the cantilevered stops are integral to the basket and limit the upward buoyant movement to maintain the floating weir within the filterwell basket the cantilevered stops are also yieldable to hand pressure to allow removal of floating weir from basket 12 by exerting an upward hand force on weir 20. This feature is useful since allows removal of the floating weir 20 to remove any debris that may have accumulated in the weir or the filterwell basket.

FIG. 3C is an isolated view of a portion of filterwell basket 12 with an alternate method of retaining the weir 20 in the filter basket as the weir moves up and down in response to water level changes. FIG. 3C shows filterwell basket 12 includes a guide slot 12*f* where a top portion of the guide slot 12*f* is laterally offset from a lower portion of the guide slot 12*f*. In this example follower 28 normally moves up and down in the lower portion of the guide slot 12*f* in response to buoyant action of the weir. A lip 12*e* extends downward preventing follower 28 from entering the top portion of guide slot 12*f* as the floating weir moves up and down within basket 12. Similarly, an identical off set guide slot with a lip (not shown) on a diagonally opposite side of basket 12 engages follower 27 on weir 20 to prevent the follower 27 from entering the top portion of an identical offset guide slot with a retaining lip as floating weir 20 moves up and down within basket 12.

A feature of the offset guide slot with a laterally offset retaining lip on both sides of the filterwell basket is that to remove weir 20 from the filterwell basket 12 one needs to slightly rotate the weir to bring the follower 28 into the top guide slot 12*f* and the follower 27 into the identical offset guide slot on the opposite side of the filterwell basket 12. Once the followers 28 and 27 are in the top portion of the guide slots one can pull weir 20 free of the filterwell basket 24.

A benefit of the offset guide slots on opposite sides of the filterwell basket is that it prevents the floating weir 20 from being removed from the filterwell basket unless one manually rotates the floating weir to bring the followers 28 and 27 into the top portion of the guide slots.

Figure 6:
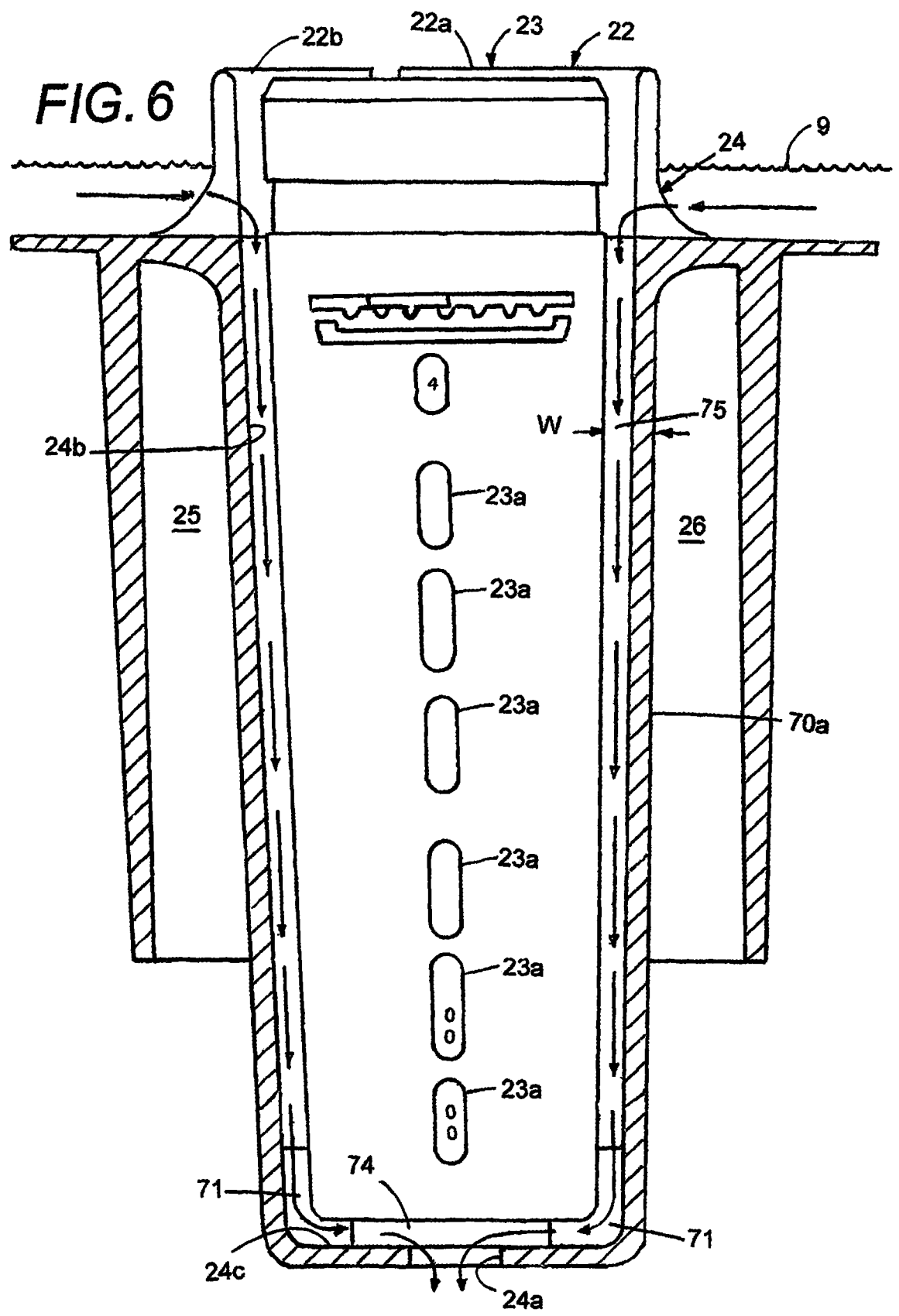
FIG. 6 is a sectional view of a cartridge jacket in the floating weir of FIG. 2 supporting a cartridge dispenser in a spaced condition.

FIG. 3A is a top view of ring 11 revealing a first extension or tab 32 and a second extension or tab 31 that engages rim of filterwell basket 12 to maintain the filterwell basket 12 in a locked condition with respect to ring 11. FIG. 3A shows weir 20 cartridge jacket 21 contains a cartridge dispenser 19, while cartridge jacket 24, which is empty, reveals a set of internal L-shaped protuberances 71 that extend across cartridge jacket bottom end 24*a* which are shown in FIG. 6 to cooperatively maintain a cartridge dispenser in a spaced condition from side wall 24*b* and end wall 24*a* to form a bight resistance annular flow path around an interior surface of a dispensing cartridge located therein.

FIG. 4 is a top view of an empty filterwell basket 12 with the filterwell basket including a rim 12*a* having a first flat 17 and a second flat 18 located diagonally opposite of flat 17. The flats permit assembly and rotationally engagement of rim 12*a* with retraining ring 11. That is, an internal basket ledge 33 in retaining ring 11 supports filterwell basket 12 within the inline filterwell dispensing system as shown in FIG. 1.

In this example filterwell basket 12 includes an arcuate ramp 13 having a stop 14 located on one side of basket 12 and located diagonally opposite is a second arcuate ramp 15 having a stop 16 that are used to support and secure filterwell basket 12 to retaining ring 11 as shown in FIG. 3A and FIG. 1.

FIG. 4A is a top view showing a partial assembly view of filterwell basket 12 mounted on an internal basket ledge 33, which is an internal component of retaining ring 11. To mount the filterwell basket in the retaining ring 11 the flat 17 of basket 12 is aligned with tab 31 and the flat 18 of basket 12 is aligned with tab 32, which allows the filterwell basket rim 12a to clear tab 31 and 32 until rim 12a comes to rest on the internal basket ledge 33. Once basket rim 12a is supported by the internal basket ledge 33 one rotates the basket until the tabs 31 and 32 engage the stops 14 and 16, which are at the end of ramp 13 and ramp 15, to retain the filterwell basket 12 within retaining ring 11.

FIG. 4A show retaining ring 11 with an internal cylindrical filterwell basket support ledge 33, a first internal tab 31 and a second internal tab 32 with the first internal tab and the second internal tab diagonally spaced from each other to cooperatively limit an axial upward displacement of a filterwell basket 12 through a sandwiching of a filterwell basket rim 12a therebetween ledge 33 and tab 31 and 32. That is, the filterwell basket support ledge 33 limits an axial downward displacement of the filterwell basket with respect to retaining ring 11 and the internal tabs 31 and 32 limit an upward displacement of filterwell basket with respect to ring 11 to maintain the filterwell basket 12 within the retaining ring.

FIG. 4A shows filterwell basket 12 with a flat 17 in alignment with tab 31 and flat 18 in alignment with tab 32 with sufficient clearance to allow filterwell basket rim 12a to by-pass tabs 31 and 32 and fall into engagement with the internal ledge 33 located within retaining ring 11. Next, one rotates the ring 11 with respect to filterwell basket rim 12a until the stops 14 and 16 engage tab 32 and tab 31 to retain the filterwell basket in position within the retaining ring 11. In this example, a first arcuate ramp 13 having a stop 14 and a second arcuate ram 15 having a stop 16 provide for locking rotational engagement of filterwell basket 12 rim 12a within the retaining ring 11.

Figure 5A:
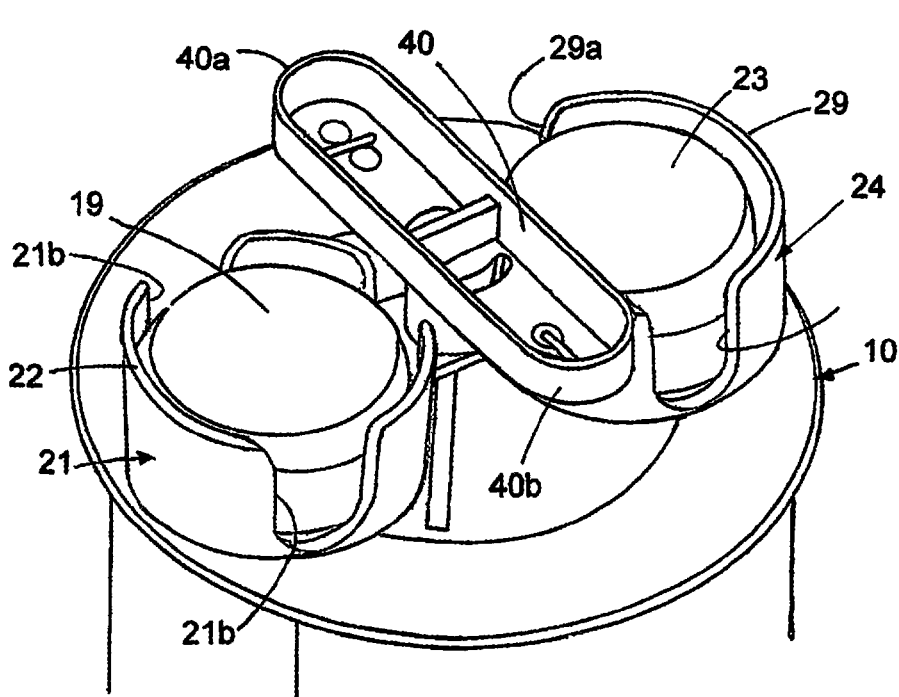
FIG. 5A is a perspective view of a cartridge retainer with a rotatable cross bar in a cartridge release position.

FIG. 5A is a perspective isolated view of one embodiment of a cartridge retainer 40 that can simultaneously hold or release two cartridge dispensers 19 and 23 from within their cartridge jackets through a rotatable cross bar with a first looped end 40a and a second looped end 40b that are engageable with a top end of a cartridge dispensers located in the cartridge jackets of the floating weir. FIG. 5A shows the cartridge retainer located in a cartridge release position that allows a person to grasp the top end of cartridge 23 through relief areas 29a and 29b and axially remove cartridge dispenser 23 form cartridge jacket 24. Similarly, one can grasp cartridge dispenser 19 through relief areas 21a and 21b to pull cartridge dispenser 19 out of cartridge jacket 21.

Figure 5B:
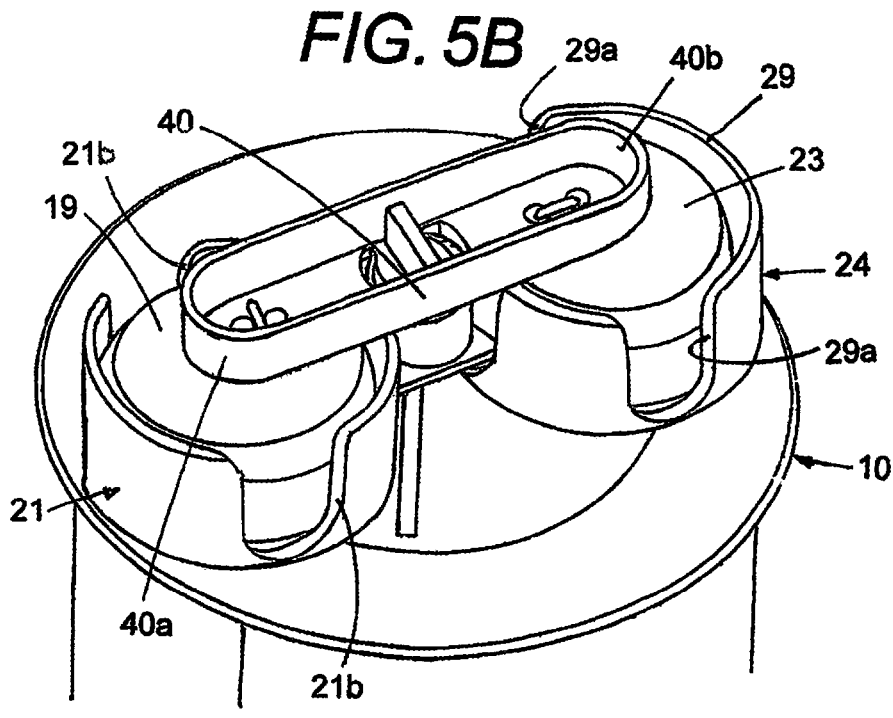
FIG. 5B is a perspective view of a cartridge retainer with a rotatable cross bar in a cartridge hold position.
Figure 5C:
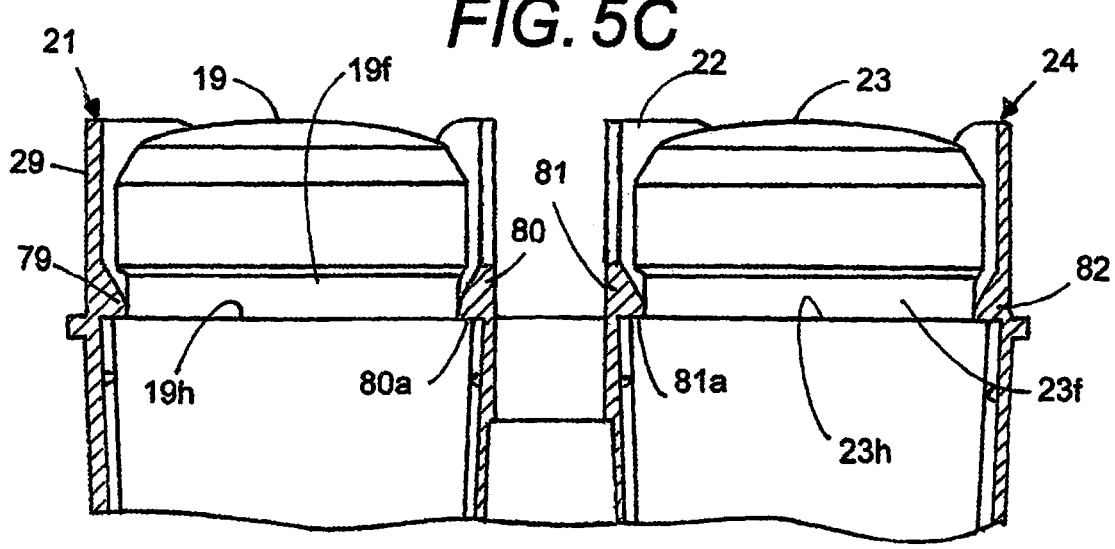
FIG. 5C is a partial sectional view of the cartridge jackets in the floating weir showing a resilient latch securing each of the cartridge dispensers within the respective cartridge jackets.

FIG. 5C is a sectional view of cartridge jacket 21 and cartridge jacket 24 with cartridge jacket 21 showing a cartridge dispenser 19 therein with a top end of the cartridge dispenser 19 located within split collar 29.

In this example cartridge dispenser 19 includes a recessed region 19f having a ledge 19h engageable with a lip 79 in jacket 21 and a lip 80a in a resilient latch 80, which is located diametrical opposite from lip 79. The resilient latch 80 comprises a cartridge retainer, which flexes outward to allow axial insertion of cartridge dispenser 19, into cartridge jacket 21 and when unflexed returns to the cartridge engaging position shown in FIG. 5c thereby securing cartridge dispenser 19 within cartridge jacket 21.

Similarly, cartridge dispenser 23 includes a recessed region 23f having a ledge 23h engageable with a lip 82 in jacket 24 and a lip 81a engaging a resilient latch 81, which is located diametrical opposite from lip 82. The resilient latch 81 comprises a cartridge retainer, which flexes outward to allow axial insertion of cartridge 24, into cartridge jacket

24 and when unflexed returns to the cartridge engaging position shown in FIG. 5C thereby securing cartridge 24 within cartridge jacket 21.

Thus, in the example shown in FIGS. 5A and 5B the cartridge retainer 40 engages a top end of the cartridge dispensers 19 and 23 to hold a cartridge within the cartridge jacket while in the example shown in FIG. 5C the cartridge retainer engages a ledge within a cartridge dispenser to secure a cartridge therein. Other cartridge retainers may be used include threads on the cartridge, bayonet tabs on the cartridge that lock in place, a snap on connector on a bottom end of the cartridge, magnets, a lanyard, or friction engagement of the cartridge dispenser with the cartridge jacket.

FIG. 6 is an isolated sectional view of cartridge jacket 24 with a split collar 22 containing a cartridge dispenser 23 with the cartridge dispenser 23 supported in a spaced condition from sidewall 24b and end wall 24c by a set of L shaped protuberances 71. In this example the L-shaped protuberances simultaneously engage side wall 24b and end wall 24c forming an annular flow chamber 75 around the cartridge dispenser 23. When the filterwell pump is on water is rapidly drawn through the larger open area passage 30 in weir 20; however, the flow chamber 75, which is isolated from the larger open area passage 30, provides a restricted water flow path that prevents a premature and rapid dissolving of the contents of a cartridge dispenser located in cartridge jacket 24. That is, a lower velocity region in flow chamber 75 creates a flow environment where the existing cartridge dispenser settings can control and maintain the output within a desired range that prevents a premature and rapid dissolving of the contents of a cartridge dispenser located therein. In this example, the water in chamber 75 flows past and in and out of the cartridge dispensing ports 23a located along an outer vertical element of cartridge dispenser 23 before exiting through port 24a in cartridge jacket 24.

A feature of the restricted annular flow passage 75 is that the viscous flow resistance due to restricted spacing between the exterior surface between the cartridge dispenser and the jacket wall 24b isolates the water entering and flowing through annular passage 75 to prevent a premature dissolution of the contents of the cartridge dispenser located therein.

In this embodiment shown cartridge jacket 21 also includes an identical restricted flow passage that isolates the velocity of the water past a cartridge dispenser in cartridge jacket 21 from the water flowing through the larger open area 30 in weir 20.

A further feature of the invention is that the restricted water flow path, which is shown in FIG. 6 is formed on-the-go by inserting a cartridge dispenser into cartridge jacket 21.

In the example shown the cartridge jacket contains a frusto conical interior for engaging with a frusto conical shape cartridge. An example of a prior art cartridge dispenser containing a frusto conical exterior that is suitable for mounting within cartridge jacket 24 is shown and described in applicant's U.S. Pat. Nos. 7,059,540; 7,487,790 and 8,617,481 which are included by reference.

While the restricted water flow passage formed by geometrical restriction is shown other flow restrictors could include a mesh a louver or membrane in the flow passage. In still other cases a different location for water entering cartridge jacket 21 or cartridge jacket 23 may be used to limit velocity past the cartridge dispenser therein to prevent unwanted velocity changes in water flowing past a cartridge dispenser therein, which can adversely affect a dispersant rate of the dispensing cartridge located therein.

Figure 7:
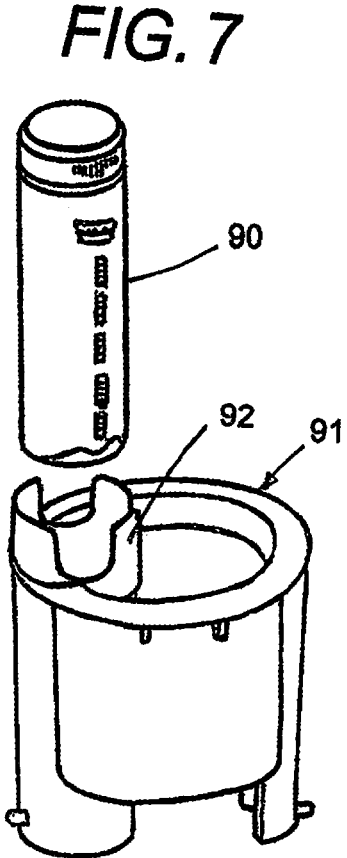
FIG. 7 shows a floating weir with a single cartridge dispenser located therein.

FIG. 7 shows an example of floating weir 90 with a single cartridge jacket for receiving a cartridge dispenser 90. In this example cartridge jacket 92 contains an identical flow restricted passage shown in cartridge jacket 21 and cartridge jacket 24. The example shown in FIG. 7 suitable if only one cartridge dispenser is to be placed in the floating weir 91. While cartridge jacket 92 is shown along a side of the floating weir the cartridge jacket 92 may be supported in other locations within weir 91 without departing from the scope of the invention.

We claim:

1. An inline floating weir comprising:
    a cartridge jacket located in the inline floating weir, the cartridge jacket having a water inlet and a water outlet therein;
    a set of protuberances within the cartridge jacket;
    a cartridge located in the cartridge jacket, the set of protuberances supporting the cartridge in a spaced condition from an interior surface of the cartridge jacket thereby forming an annular water flow path between the interior surface of the cartridge jacket and an exterior surface of the cartridge; and
    a further cartridge jacket located in the said inline floating weir, the further cartridge jacket having a water inlet and a water outlet therein;
    a set of further protuberances within the said further cartridge jacket;
    a further cartridge located in the said further cartridge jacket, the set of further protuberances supporting the further cartridge in a spaced condition from an interior surface of the further cartridge jacket thereby forming a further annular water flow path between the interior surface of the further cartridge jacket and an exterior surface of the further cartridge; and
    a cartridge retainer comprising either: (i) a rotatable crossbar engaged with both a top end of the cartridge and a top end of the further cartridge to removably secure the cartridge and the further cartridge within the inline floating weir, or (ii) a lip of the cartridge jacket engaged with a ledge of the cartridge, where the lip of the cartridge jacket is part of a resilient latch configured to flex outward to allow axial insertion of the cartridge into the cartridge jacket and when unflexed returns to a cartridge engaging position securing the cartridge within the cartridge jacket, and a lip of the further cartridge jacket engaged with a ledge of the further cartridge, where the lip of the further cartridge jacket is part of a resilient latch configured to flex outward to allow axial insertion of the further cartridge into the further cartridge jacket and when unflexed returns to a cartridge engaging position securing the further cartridge within the further cartridge jacket.

2. The inline floating weir of claim 1 wherein the water inlet is at a top end of the cartridge jacket and the water outlet is at a bottom end of the cartridge jacket, and wherein the further water inlet is at a top end of the further cartridge jacket and the further water outlet is at a bottom end of the further cartridge jacket.

3. The inline floating weir of claim 2 wherein the water outlet in the cartridge jacket is an elongated water outlet, and the further water outlet in the further cartridge jacket is an elongated water outlet.

4. The inline floating weir of claim 2 wherein the cartridge jacket and the further cartridge jacket each have a frusto-conical shape.

5. The inline floating weir of claim 2 wherein the water inlet in the cartridge jacket is located within a split collar of the cartridge jacket, and the further water inlet in the further cartridge jacket is located within a further split collar of the further cartridge jacket.

6. The inline floating weir of claim 1 including a follower on the cartridge jacket and a further follower on the further cartridge jacket, with each follower slidably engageable with a filterwell basket.

7. The inline floating weir of claim 1 wherein the cartridge jacket and the further cartridge jacket are diagonally spaced from each other within the inline floating weir.

8. The inline floating weir of claim 1 where the cartridge includes a mineral and the further cartridge includes a sanitizer.

9. The inline floating weir of claim 1 further including a filterwell basket comprising a first weir guide slot and a further weir guide slot, and the inline floating weir comprises a follower on the cartridge jacket and a further follower on the further cartridge jacket, the follower slidably engaged in the weir guide slot of the filterwell basket, and the further follower slidably engaged in the further weir guide slot of the filterwell basket.

10. The inline floating weir of claim 9 wherein the first weir guide slot and the further weir guide slot are diagonally opposite of each other.

11. The inline floating weir of claim 1 wherein the inline floating weir is nested within a filterwell basket so as to be slidable up and down within the filterwell basket in response to a change in a water level within the inline floating weir while the cartridge jacket allows water to enter the annular water flow path and the further cartridge jacket allows water to enter the further annular flow path.

12. The inline floating weir of claim 1 further including a first trapped air float, a second trapped air float, and a central open region, the first and second trapped air floats configured to support the inline floating weir while allowing the inline floating weir to move up and down within a filterwell basket as water flows through the central open region of the inline floating weir.

13. The inline floating weir of claim 12 wherein the central open region is larger than, and isolated from, the annular water flow path and the further annular water flow path.

14. The inline floating weir of claim 5 wherein a top end of the cartridge is located within the split collar of the cartridge jacket, and the top end of the further cartridge is located within the further split collar of the further cartridge jacket.

15. The inline floating weir of claim 5 wherein the split collar of the cartridge jacket has gaps therein that permit a person to grasp and remove the cartridge held within the cartridge jacket, and the further split collar of the further cartridge jacket has gaps therein that permit a person to grasp and remove the further cartridge held within the further cartridge jacket.

16. The inline floating weir of claim 15 wherein the split collar of the cartridge jacket and the further split collar of the further cartridge jacket extend above a water line when the inline floating weir floats freely while the gaps in the split collar provide a path for water entry into the cartridge jacket and the gaps in the further split collar provide a path for water entry into the further cartridge jacket.

17. The inline floating weir of claim 9 wherein the filterwell basket has a porous bottom and a porous sidewall.

18. An inline floating weir comprising:
    a cartridge jacket located in the inline floating weir, the cartridge jacket having a water inlet and a water outlet therein;

a set of protuberances within the cartridge jacket;

a cartridge located in the cartridge jacket, the set of protuberances supporting the cartridge in a spaced condition from an interior surface of the cartridge jacket thereby forming an annular water flow path between the interior surface of the cartridge jacket and an exterior surface of the cartridge; and a further cartridge jacket located in the inline floating weir, the further cartridge jacket having a water inlet and a water outlet therein;

a set of further protuberances within the further cartridge jacket;

a further cartridge located in the further cartridge jacket, the set of further protuberances supporting the further cartridge in a spaced condition from an interior surface of the further cartridge jacket thereby forming a further annular water flow path between the interior surface of the further cartridge jacket and an exterior surface of the further cartridge; and a cartridge retainer securing the cartridge, or securing both the cartridge and the further cartridge, removably within the inline floating weir, the inline floating weir nested within a filterwell basket, the cartridge jacket including a lateral extension that engages a first guide slot in the filterwell basket, the further cartridge jacket including a lateral extension that engages a further guide slot in the filterwell basket, such that the inline floating weir is free to move up and down within the filterwell basket in response to water level changes within the inline floating weir.

19. The inline floating weir of claim 18 further including a first trapped air float, a second trapped air float, and a central open region, the first and second trapped air floats configured to support the inline floating weir while allowing the inline floating weir to move up and down within the filterwell basket as water flows through the central open region of the inline floating weir.

20. The inline floating weir of claim 19 wherein the central open region is larger than, and isolated from, the annular water flow path and the further annular water flow path.

21. The inline floating weir of claim 18 wherein the cartridge retainer either engages a ledge within the cartridge or engages both a top end of the cartridge and a top end of the further cartridge.

* * * * *